(12) United States Patent
Yamamoto et al.

(10) Patent No.: US 9,714,340 B2
(45) Date of Patent: Jul. 25, 2017

(54) FLAME-RETARDANT POLYBUTYLENE TEREPHTHALATE RESIN COMPOSITION

(71) Applicant: KANEKA CORPORATION, Osaka-shi, Osaka (JP)

(72) Inventors: Tetsuro Yamamoto, Settsu (JP); Kazunori Saegusa, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/782,805

(22) PCT Filed: Apr. 9, 2014

(86) PCT No.: PCT/JP2014/060262
§ 371 (c)(1),
(2) Date: Oct. 7, 2015

(87) PCT Pub. No.: WO2014/168169
PCT Pub. Date: Oct. 16, 2014

(65) Prior Publication Data
US 2016/0304712 A1    Oct. 20, 2016

(30) Foreign Application Priority Data

Apr. 9, 2013    (JP) ................ 2013-0081533

(51) Int. Cl.
C08K 5/34    (2006.01)
C08L 67/02   (2006.01)
C08K 5/49    (2006.01)

(52) U.S. Cl.
CPC ............. *C08L 67/02* (2013.01); *C08K 5/49* (2013.01); *C08L 2201/02* (2013.01); *C08L 2205/03* (2013.01); *C08L 2205/035* (2013.01)

(58) Field of Classification Search
CPC ............. C08L 67/02; C08L 2201/02; C08L 2205/035; C08L 2205/03
USPC ........................................................ 524/101
See application file for complete search history.

(56) References Cited

U.S. PATENT DOCUMENTS

| 2009/0088503 A1* | 4/2009 | Takagi | .................... C08L 67/02 524/117 |
| 2009/0253837 A1 | 10/2009 | Takagi et al. | |
| 2013/0203905 A1* | 8/2013 | Hirakawa | ............... C08L 67/02 524/101 |

FOREIGN PATENT DOCUMENTS

| JP | 2002-294049 A | | 10/2002 |
| JP | 2005-306975 A | | 11/2005 |
| JP | 2005306975 A | * | 11/2005 |
| JP | 2007-112875 A | | 5/2007 |
| JP | 2007-297495 A | | 11/2007 |
| JP | 2011-213951 A | | 10/2011 |
| JP | 2013-6985 A | | 1/2013 |
| JP | 2013-112698 A | | 6/2013 |
| JP | 2014-80501 A | | 5/2014 |
| WO | 2006/106824 A1 | | 10/2006 |
| WO | 2007/040075 A1 | | 4/2007 |
| WO | 2011/148796 A1 | | 12/2011 |
| WO | 2013/076918 A1 | | 5/2013 |

OTHER PUBLICATIONS

Translation of JP2005306975, Nov. 4, 2005.*
International Search Report dated Jun. 10, 2014, issued in counterpart International Application No. PCT/JP2014/060262 (2 pages).

* cited by examiner

*Primary Examiner* — Hui Chin
(74) *Attorney, Agent, or Firm* — Westerman, Hattori, Daniels & Adrian, LLP

(57) ABSTRACT

A halogen-free flame retardant polybutylene terephthalate resin composition contains 5 to 80 parts by weight of a phosphorus flame retardant (B) having a polyester structure in the main chain, 20 to 120 parts by weight of a nitrogen compound (C), 1 to 50 parts by weight of talc (D), and 0.1 to 2 parts by weight of an anti-dripping agent (E), based on 100 parts by weight of a polybutylene terephthalate resin (A) and exhibits a comparative tracking index of 400 V or higher in a tracking resistance test in accordance with IEC60112. The halogen-free flame retardant polybutylene terephthalate resin composition does not contain a halogen containing flame retardant, has high flame retardancy and high tracking resistance, and can be suitably used as members for electric/electronic parts.

8 Claims, No Drawings

FLAME-RETARDANT POLYBUTYLENE TEREPHTHALATE RESIN COMPOSITION

TECHNICAL FIELD

The present invention relates to a flame-retardant polybutylene terephthalate resin composition not containing a halogen containing flame retardant and having high flame retardancy and high tracking resistance and a molded body to be used as members for electric/electronic parts and members for vehicles.

BACKGROUND ART

A thermoplastic polyester resin typified by polyalkylene terephthalate and the like has been widely used for parts of electric/electronic devices, automobiles, and the like due to the outstanding properties. In recent years, a demand for the safety against fire tends to be severer particularly in the electric/electronic devices and the number of examples in which resin materials to be used in the parts configuring the electric/electronic devices are required to have high flame retardancy increase. Heretofore, in imparting flame retardancy to resin materials, halogen containing flame retardants have been used in many cases because the properties thereof are easily balanced with other physical properties. However, the use of the halogen containing flame retardant has posed problems, e.g., a case of generation of acidic gas in incineration processing of resin parts, a case of generation of poisonous gas on a fire spot, and marine pollution. Therefore, due to an increase in the environmental awareness in recent years, a demand for halogen-free flame retardancy has increased, and thus it has been demanded to impart halogen-free flame retardancy to resin materials.

As general halogen-free flame retardancy imparting methods, a method for imparting frame retardancy using metal hydroxides and a method for imparting frame retardancy using phosphorus are mentioned. However, the metal hydroxides have disadvantages in that the metal hydroxides cannot impart frame retardancy unless a large amount of the metal hydroxides are compounded and also when a large amount of the metal hydroxides is compounded, the dynamic characteristics decrease. As the method for imparting frame retardancy using phosphorus, a method for imparting frame retardancy using red phosphorus and a method for imparting frame retardancy using organic phosphorus are known. When red phosphorus is used, the capability to impart flame retardancy is high but the handling thereof is difficult, e.g., generation of poisonous phosphine gas due to moisture and heat generated during drying and processing and the like. On the other hand, as the method for imparting frame retardancy using organic phosphorus, examples using (condensed) phosphate ester and phosphazene are known. Among the above, the (condensed) phosphate ester is an oligomer, and therefore bleed-out occurs after molding and the original flame retardancy is lost by bleed-out or volatilization of frame retardant components in a high temperature environment in some cases. Phosphazene has high heat resistance but is disadvantageous in that phosphazene is expensive.

In recent years, the utilization of electronic control and electric drive has increased in various applications including automobiles and the use thereof at a higher voltage has increased. Therefore, members to which polyalkylene terephthalate resin is applied tend to be required to have high tracking resistance. Accordingly, a polyalkylene terephthalate resin composition excellent in flame retardancy required as electric products has been increasingly required.

In particular, since the operating temperatures of the electric/electronic devices typified by an OA fixing device, a transforming device, a power module device, an inverter device, and the like are high and the devices are exposed also to high voltages, the balance among heat resistance, flame retardancy, and electrical properties is required also in resin materials to be used in parts thereof (hereinafter referred to as electric/electronic parts) and further a halogen-free flame retardancy imparting technique is also required.

For example, Patent Document 1 discloses Examples of a composition in which the flame-retardancy maintenance and the tracking resistance are improved using a polybutylene terephthalate resin and polyethylene terephthalate resin in combination with epoxy-modified styrene resin, phosphate ester, a triazine compound, a salt of cyanuric acid or isocyanuric acid, and talc (Table 3 of Paragraph [0131] and Paragraph [0143] of Patent Document 1). However, since the evaluation in a high flame-retardant test at $1/32$ inch is V-1 and a large amount of phosphate ester and epoxy-modified styrene resin are compounded, the heat resistance is considered to be low, and therefore the composition has room for improvement.

Moreover, for example, Patent Document 2 discloses a resin composition in which an organophosphorus flame retardant of a specific structure and amorphous resin are compounded in a thermoplastic polyester resin but does not describe specific examples in the case of a polybutylene terephthalate (PBT) resin and the resin composition has room for improvement in terms of electrical properties.

Furthermore, Patent Document 3 discloses a resin composition in which a phosphorus flame retardant having a specific structure and at least one kind of amorphous thermoplastic resin selected from the group consisting of polyetherimide resin, polysulfone resin, and polyarylate resin are compounded in a thermoplastic polyester resin, for example, but does not describe specific examples in the case of polybutylene terephthalate (PBT) resin, and the resin composition has room for improvement in terms of electrical properties.

CITATION LIST

Patent Literature

Patent Document 1: JP-A No. 2002-294049
Patent Document 2: International Publication WO 2007/040075
Patent Document 3: JP-A No. 2011-213951

SUMMARY OF INVENTION

Technical Problem

It is an object of the present invention to provide a flame-retardant polybutylene terephthalate resin composition not containing a halogen containing flame retardant and imparted with high flame retardancy and high tracking resistance and members for electric/electronic parts and members for vehicles containing the same.

Solution to Problem

The present inventors have repeatedly conducted an extensive research. As a result, the present inventors have found that a composition obtained by compounding a phosphorus flame retardant having a polyester structure in the main chain, a nitrogen compound, talc, and an anti-dripping agent in a polybutylene terephthalate resin has a low environmental load and achieves both high flame retardancy and tracking resistance, and thus have accomplished the present invention.

Furthermore, the present inventors have found that the moisture and heat resistance of the resin composition is improved by further compounding an Acrylonitrile-Stylene resin and a hydrolysis stabilizer in a polybutylene terephthalate resin.

More specifically, the present invention relates to a halogen-free flame retardant polybutylene terephthalate resin composition containing 5 to 80 parts by weight of a phosphorus flame retardant (B) having a polyester structure in a main chain, 20 to 120 parts by weight of a nitrogen compound (C), 1 to 50 parts by weight of talc (D), and 0.1 to 2 parts by weight of an anti-dripping agent (E), based on 100 parts by weight of a polybutylene terephthalate resin (A) and exhibiting a comparative tracking index of 400 V or higher in a tracking resistance test in accordance with IEC60112.

In a preferable embodiment, the flame-retardant polybutylene terephthalate resin composition further contains 5 to 80 parts by weight of a phosphorus flame retardant other than the phosphorus flame retardant (B) having a polyester structure in the main chain based on 100 parts by weight of the polybutylene terephthalate resin (A).

In a preferable embodiment, the flame-retardant polybutylene terephthalate resin composition has a content of phosphorus atoms in the resin composition of 0.3 to 3.5% by weight and a content of nitrogen atoms in the resin composition of 4 to 14% by weight.

In a preferable embodiment, the flame-retardant polybutylene terephthalate resin composition further contains 1 to 20 parts by weight of an amorphous thermoplastic resin (F) based on 100 parts by weight of the polybutylene terephthalate resin (A).

In a preferable embodiment, the flame-retardant polybutylene terephthalate resin composition further contains 1 to 40 parts by weight of an Acrylonitrile-Stylene resin based on 100 parts by weight of the polybutylene terephthalate resin (A).

In a preferable embodiment, the flame-retardant polybutylene terephthalate resin composition further contains 5 to 120 parts by weight of an inorganic filler (G) other than talc based on 100 parts by weight of the polybutylene terephthalate resin (A).

In a preferable embodiment, the flame-retardant polybutylene terephthalate resin composition further contains 0.03 to 15 parts by weight of a hydrolysis stabilizer (H) based on 100 parts by weight of the polybutylene terephthalate resin (A).

A second aspect of the present invention relates to a molded article of the flame-retardant polybutylene terephthalate resin composition according to the present invention described above.

A third aspect of the present invention relates to electric/electronic parts containing the flame-retardant polybutylene terephthalate resin composition according to the present invention described above.

Advantageous Effects of Invention

According to the present invention, high flame retardancy and high tracking resistance can be imparted to polybutylene terephthalate resin without the use of a halogen containing flame retardant. Therefore, the present invention can be suitably used for members for electric/electronic parts and members for vehicles used at high voltages, and thus the present invention is industrially useful.

DESCRIPTION OF EMBODIMENTS

Hereinafter, preferable embodiments of the present invention are described but the present invention is not limited to the following description.

(Polybutylene Terephthalate Resin (A))

The polybutylene terephthalate resin (A) to be used in the present invention can copolymerize other components at a ratio of not sharply reducing the physical properties. As the copolymerization components, known acid components, alcohol components and/or phenol components, or derivatives thereof having ester forming ability can be used.

As copolymerizable acid components, divalent or higher aromatic carboxylic acids having 8 to 22 carbon atoms, divalent or higher aliphatic carboxylic acids having 4 to 12 carbon atoms, divalent or higher alicyclic carboxylic acids having 8 to 15 carbon atoms, and derivatives thereof having ester forming ability are mentioned, for example. As specific examples of the copolymerizable acid components, isophthalic acid, naphthalene dicarboxylic acid, bis(p-carbodiphenyl)methane anthracene dicarboxylic acid, 4,4'-biphenyl dicarboxylic acid, 1,2-bis(phenoxy)ethane-4,4'-dicarboxylic acid, 5-sodium sulfoisophthalic acid, adipic acid, sebacic acid, azelaic acid, dodecanedioic acid, maleic acid, trimesic acid, trimellitic acid, pyromellitic acid, 1,3-cyclohexanedicarboxylic acid, 1,4-cyclohexanedicarboxylic acid, and derivatives thereof having ester forming ability are mentioned, for example. These substances are used alone or in combination of two or more kinds thereof. Among the above, isophthalic acid and naphthalene dicarboxylic acid are preferable because the physical properties, handling properties, and ease of reaction of resin to be obtained are excellent.

As the copolymerizable alcohol and/or phenol components, divalent or higher aliphatic alcohols having 2 to 15 carbon atoms, divalent or higher alicyclic alcohols having 6 to 20 carbon atoms, divalent or higher aromatic alcohol having 6 to 40 carbon atoms, and divalent or higher phenol, and derivatives thereof having ester forming ability are mentioned, for example.

As specific examples of the copolymerizable alcohol and/or phenol components, compounds such as ethylene glycol, propanediol, hexanediol, decanediol, neopentyl glycol, cyclohexane dimethanol, cyclohexanediol, 2,2' bis(4-hydroxyphenyl)propane, 2,2'-bis(4-hydroxycyclohexyl)propane, hydroquinone, glycerol, and pentaerythritol, derivatives thereof having ester forming ability, and cyclic esters such as ε-caprolactone, are mentioned. Among the above, ethylene glycol and propanediol are preferable because the physical properties, the handling properties, and ease of reaction of resin to be obtained are excellent.

Furthermore, a polyalkylene glycol unit may be partially copolymerized. As specific examples of the polyalkylene glycol, polyethylene glycol, polypropylene glycol, polytetramethylene glycol, random or block copolymers thereof, modified polyoxyalkylene glycols such as alkylene glycol (for example, polyethylene glycol, polypropylene glycol, polytetramethylene glycol, random or block copolymers thereof, and the like) adducts of bisphenol compounds, and the like are mentioned, for example. Among the above, a polyethylene glycol adduct of bisphenol A having a molecular weight of 500 to 2000 is preferable because the heat stability in copolymerization is good and the heat resistance of a molded body hardly decreases.

The polybutylene terephthalate resin (A) in the present invention can be obtained by known polymerization methods, e.g., melt polycondensation, solid phase polycondensation, solution polymerization, and the like. In order to improve the color tone of resin in polymerization, one or two or more of compounds such as phosphoric acid, phosphorous acid, hypophosphoric acid, monomethyl phosphate, dimethyl phosphate, trimethyl phosphate, methyl diethyl phosphate, triethyl phosphate, triisopropyl phosphate, tributyl phosphate, and triphenyl phosphate, may be added.

Furthermore, in order to increase the crystallinity degree of the polybutylene terephthalate resin (A) to be obtained, various usually well-known organic or inorganic crystal nucleating agents may be added alone or in combination of two or more kinds thereof in polymerization.

The intrinsic viscosity (measured at 25° C. in a phenol/tetrachloroethane mixed solution with a weight ratio of 1/1) of the polybutylene terephthalate resin (A) to be used in the present invention is preferably 0.4 to 1.3 dl/g, and more preferably, 0.6 to 1.2 dl/g. When the intrinsic viscosity is less than 0.4 dug, the mechanical strength and the impact resistance tend to decrease. When the intrinsic viscosity exceeds 1.3 dl/g, the fluidity in molding tends to decrease. Two or more kinds of polybutylene terephthalate resin having an intrinsic viscosity outside the ranges mentioned above may be mixed to give a polybutylene terephthalate resin having an intrinsic viscosity within the range.

(Phosphorus Flame Retardant (B) Having Polyester Structure in Main Chain)

The phosphorus flame retardant (B) having a polyester structure in the main chain in the present invention is represented by the following general formulae 1 and 2. The flame retardant (B) has a structure in which X, Y, and Z in the general formula 1 represent an alkyl group, a cycloalkyl group, an aryl group, or an aralkyl group having 1 to 20 carbon atoms and a phosphorus atom is contained in at least one of X, Y, and the Z. The lower limit value of the repeating unit n is n=2, preferably, n=3, and particularly preferably, n=5. In the case of less than n=2, the crystallization of the polybutylene terephthalate resin (A) tends to be hindered and the mechanical strength tends to decrease. The upper limit value of the repeating unit n is not particularly specified. However, when a molecular weight is excessively increased, the dispersibility and the like tend to be adversely affected. Therefore, the upper limit value of the repeating unit n is preferably n=40, more preferably, n=35, and still more preferably, n=30. m may be an integer of 0 or more.

General Formula 1

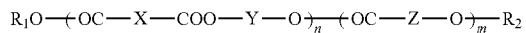

[C. 1]

(In General Formula 1, n is an integer of 2 or more and m is an integer of 0 or more. $R_1$ and $R_2$ are a hydrogen atom or an alkyl group, a cycloalkyl group, an aryl group, or an aralkyl group having 1 to 30 carbon atoms and may be the same or different from each other.)

General Formula 2

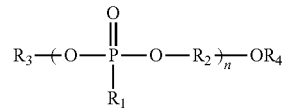

[C. 2]

(In General Formula 2, n is an integer of 2 or more, $R_1$, $R_2$, $R_3$, and $R_4$ are a hydrogen atom, an alkyl group, a cycloalkyl group, an aryl group, or an aralkyl group and may be the same or different from each other.)

As a preferable structure of the phosphorus flame retardant (B) having a polyester structure in the main chain, those represented by the following general formula 3 and particularly those represented by the following general formula 4 are mentioned.

General Formula 3

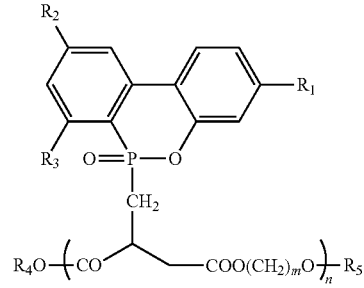

[C. 3]

(In General Formula 3, n is an integer of 2 to 40, m is an integer of 1 to 10, $R_1$, $R_2$, $R_3$, $R_4$, and $R_5$ are a hydrogen atom, an alkyl group, a cycloalkyl group, an aryl group, or an aralkyl group and may be the same or different from each other.)

General Formula 4

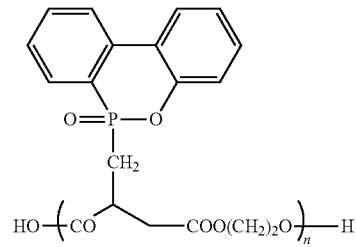

[C. 4]

(In General Formula 4, n is an integer of 2 to 40.)

A method for producing the phosphorus flame retardant (B) having a polyester structure in the main chain to be used in the present invention is not particularly limited and is obtained by a general polycondensation reaction, and, for example, is obtained by the following method.

More specifically, in 9,10-dihydro-9-oxa-10-phosphaphenanthrene-10-oxide represented by the following structural formula,

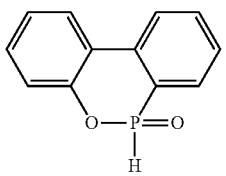
[C. 5]

a required amount of itaconic acid and ethylene glycol in an amount of at least twice by mole the amount of the itaconic acid are mixed, and then the mixture is heated and stirred under a nitrogen gas atmosphere at a temperature between 120 to 200° C. to thereby give a reactant of 9,10-dihydro-9-oxa-10-phosphaphenanthrene-10-oxide, itaconic acid, and ethylene glycol. To the obtained reactant, antimony trioxide and zinc acetate or a germanium catalyst such as germanium dioxide and a titanium catalyst such as tetrabutoxide titanium, are added to cause a polycondensation reaction while distilling off the ethylene glycol under the conditions where the setting temperature is set to and held at 245° C. under vacuum reduced pressure of 1 Torr or less. After about 5 hours, when the distilled amount of the ethylene glycol extremely decreases, the reaction is regarded to be completed. The obtained phosphorus flame retardant having a polyester structure in the main chain is a solid having a molecular weight of 4000 to 40000 and the content of phosphorus atoms measured by an ICP-AES method is 6.5 to 8.5% by weight.

As a germanium compound to be used as the catalyst according to the present invention, germanium oxides such as germanium dioxide, germanium alkoxides such as germanium tetraethoxide and germanium tetraisopropoxide, germanium hydroxide and an alkali metal salt thereof, germanium glycolate, germanium chloride, germanium acetate, and the like are mentioned. These substances are used alone or in combination of two or more kinds thereof. Among these germanium compounds, germanium dioxide is particularly preferable.

The catalytic amount of the germanium dioxide to be charged in the polymerization is preferably economically 1000 ppm or less.

The content of the phosphorus flame retardant (B) having a polyester structure in the main chain based on 100 parts by weight of the polybutylene terephthalate resin (A) is preferably 5 to 80 parts by weight. From the viewpoint of flame retardancy, the content of the retardant (B) is preferably 5 parts by weight or more, more preferably, 7 parts by weight or more, still more preferably, 10 parts by weight or more, particularly preferably, 12 parts by weight or more, and most preferably, 20 parts by weight or more. From the viewpoint of extrusion processability, moldability, and the mechanical strength and the cost of a molded body, the content of the retardant (B) is preferably 80 parts by weight or less, more preferably, 75 parts by weight or less, and still more preferably, 70 parts by weight or less.

(Nitrogen Compound (C))

The nitrogen compound (C) in the present invention can further improve the flame retardancy by the use of the phosphorus flame retardant (B) having a polyester structure in the main chain in combination. As the nitrogen compound, triazine compounds such as a melamine-cyanuric acid adduct, melamine, and cyanuric acid, tetrazole compounds, and the like are mentioned, for example. Or, melam and/or melem which are/is a dimer and/or a trimer of melamine are mentioned. Among the above, the melamine-cyanuric acid adduct is preferable in terms of mechanical strength.

The melamine-cyanuric acid adduct in the present invention is a compound formed by melamine (i.e., 2,4,6-triamino-1,3,5-triazine) and cyanuric acid (i.e., 2,4,6-trihydroxy-1,3,5-triazine) and/or a tautomer thereof.

The melamine-cyanuric acid adduct can be obtained by a method including mixing a melamine solution and a cyanuric acid solution to form a salt, a method including adding one solution to the other solution to form a salt while dissolving the mixture, and the like. The mixing ratio of the melamine and the cyanuric acid is not particularly limited and the mixing ratio is preferably close to an equimolar ratio and is particularly preferably an equimolar ratio in terms that an adduct to be obtained hardly impair the heat stability of the polybutylene terephthalate resin (A).

The average particle diameter of the melamine-cyanuric acid adduct in the present invention is not particularly limited and is preferably 0.01 to 250 μm, and particularly preferably, 0.5 to 200 μm in terms that the strength property and the molding processability of a composition to be obtained are not impaired.

The content of the nitrogen compound (C) in the flame-retardant polybutylene terephthalate resin composition of the present invention is preferably 20 to 120 parts by weight based on 100 parts by weight of the polybutylene terephthalate resin. The lower limit value is preferably 20 parts by weight, more preferably, 30 parts by weight, still more preferably, 35 parts by weight, and most preferably, 40 parts by weight. When the nitrogen compound (C) content is less than 20 parts by weight, the flame retardancy and the tracking resistance tend to decrease. The upper limit value of the nitrogen compound (C) content is preferably 120 parts by weight, more preferably, 100 parts by weight, and still more preferably, 70 parts by weight. When the nitrogen compound (C) content exceeds 120 parts by weight, the extrusion processability deteriorates or the strength, the mechanical strength, and the moisture and heat resistance of a weld portion tend to decrease.

(Phosphorus Flame Retardant Other than (B))

In the present invention, a phosphorus flame retardant other than the flame retardant (B) described above can be used in combination in the range where the tracking resistance, the heat resistance, and the dynamic characteristics are not sharply impaired in addition to the phosphorus flame retardant (B) having a polyester structure in the main chain and the nitrogen compound (C). As such a phosphorus flame retardant, phosphorus flame retardants represented by the following general formulae 5, 6, 7, and 8 are mentioned, for example.

General Formula 5

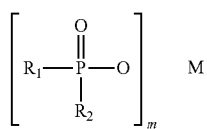
[C. 6]

General Formula 6

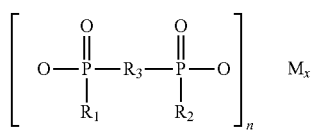
[C. 7]

(In the general formulae 5 and 6, $R_1$ and $R_2$ are straight chain or branched chain alkyl groups having 1 to 6 carbon atoms which may contain a phenyl group, hydrogen, and one hydroxyl group, $R_3$ is a straight chain or branched chain alkylene group, arylene group, alkylarylene group, or arylalkylene group having 1 to 10 carbon atoms, M is alkaline-earth metal, alkaline metal, Zn, Al, Fe, or boron, m is an integer of 1 to 3, n is an integer of 1 or 3, and x is 1 or 2.

General Formula 7

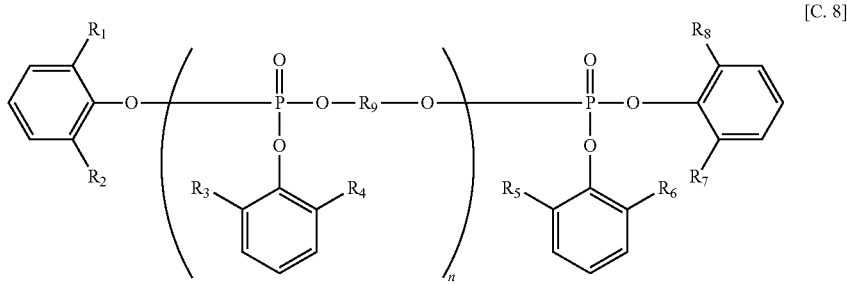

[C. 8]

(In the general formula 7, $R_1$ to $R_8$ represent hydrogen atoms or alkyl groups having carbon atoms of 6 or less, n represents an integer of 0 to 10, and $R_9$ represents a divalent or higher organic group.)

Among the above, in the general formula 7, $R_1$ to $R_8$ are preferably alkyl groups having carbon atoms of 6 or less and particularly preferably methyl groups in order to increase the hydrolysis resistance. n is preferably 1 to 3 and particularly preferably 1. $R_9$ represents a divalent or higher organic group. The divalent or higher organic group in this case represents a divalent or higher group which can be obtained by removing one or more hydrogen atoms bonded to carbon from alkyl groups, cycloalkyl groups, aryl groups, and the like which are organic groups.

General Formula 8

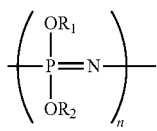

[C. 9]

(In the general formula 8, $R_1$ and $R_2$ represent the same aromatic group or different aromatic groups and n represents an integer of 3 to 30.)

Furthermore, polyphosphoric acid melamine-melam-melem double salt and the like are mentioned and one kind or two or more kinds thereof can be used.

The content of the phosphorus flame retardants other than the flame retardant (B) in the flame-retardant polybutylene terephthalate resin composition of the present invention is preferably 5 to 80 parts by weight based on 100 parts by weight of the polybutylene terephthalate resin. From the viewpoint of flame retardancy, the content of the phosphorus flame retardant is preferably 5 parts by weight or more, more preferably, 7 parts by weight or more, still more preferably, 10 parts by weight or more, particularly preferably, 12 parts by weight or more, and most preferably, 20 parts by weight or more. From the viewpoint of extrusion processability, moldability, and the mechanical strength and the cost of a molded body, the content of the phosphorus flame retardant is preferably 80 parts by weight or less, more preferably, 75 parts by weight or less, and still more preferably, 70 parts by weight or less.

(Other Flame Retardants)

In the present invention, flame retardants other than the phosphorus flame retardant (B) having a polyester structure in the main chain, other phosphorus flame retardants, and the nitrogen compound (C) described above can be used in combination in a range where the tracking resistance, the heat resistance, and the dynamic characteristics do not sharply decrease. For example, metal hydroxide flame retardants such as magnesium hydroxide, boehmite, and zinc borate, silicone flame retardants such as polyorganosiloxane or a copolymer thereof, metal salt flame retardants such as sodium perfluorobutane sulfonate, and the like are mentioned, and one kind or two or more kinds thereof can be used.

(Phosphorus Atom Content and Nitrogen Atom Content)

The phosphorus atom content and the nitrogen atom content in the flame-retardant polybutylene terephthalate resin composition in the present invention are determined by an ICP-AES method, an X-ray Fluorescence Analysis, and the like and can be determined using the following equation 1 or equation 2 as a substitute.

(Phosphorus atom content %)=(Number of parts by weight of phosphorus flame retardant)/(Sum of number of parts by weight of all the compounding agents in formulation example)×(Phosphorus atom content in phosphorus flame retardant %)     Equation 1

(Nitrogen atom content %)=(Number of parts by weight of nitrogen compound C)/(Sum of number of parts by weight of all the compounding agents in formulation example)×(Nitrogen atom content in nitrogen compound C%)     Equation 2

The phosphorus atom content in the flame-retardant polybutylene terephthalate resin composition in the present invention is preferably 0.3 to 3.5% by weight. From the viewpoint of flame retardancy, the lower limit value of the phosphorus atom content is preferably 0.3% by weight, more preferably, 0.35% by weight, and still more preferably, 0.4% by weight. The upper limit value of the phosphorus atom content is preferably 3.5% by weight, more preferably, 2.5% by weight, and still more preferably, 2.0% by weight from the viewpoint of extrusion processability, moldability, and the mechanical strength and the cost of a molded body.

The nitrogen atom content in the flame-retardant polybutylene terephthalate resin composition in the present invention is preferably 4 to 14% by weight. The lower limit value of the nitrogen atom content is preferably 4% by weight, more preferably, 6% by weight, still more preferably, 6.5% by weight, and most preferably, 7% by weight from the viewpoint of flame retardancy and tracking resistance. The upper limit value of the nitrogen atom content is preferably 14% by weight, more preferably, 12.5% by weight, and still more preferably, 11% by weight from the viewpoint of extrusion processability and the strength, the mechanical strength, and the moisture and heat resistance of a weld part.
(Talc (D))

When the talc (D) to be used in the present invention is used in combination with the phosphorus flame retardant (B) having a polyester structure in the main chain and the nitrogen compound (C), the talc (D) improves the flame retardancy without lowering the tracking resistance. The talc (D) to be used in the present invention may be generally a natural product containing magnesium oxide and silicate represented by a chemical composition formula [$Mg_3Si_4O_{10}(OH)_2$] and particularly may be an iron containing species or a nickel containing species. The crystal form of talc particles is not particularly limited and may be a plate-like crystal or a columnar crystal.

The average particle diameter of the talc (D) in the present invention is not particularly limited and is preferably 0.1 to 50 μm, and more preferably, 0.5 to 25 μm in terms of not impairing the strength property and the molding processability of a composition to be obtained. From the viewpoint of extrusion processability, compressed and pulverized talc may be used. The average particle diameter of the compressed and pulverized talc is preferably 50 μm or more, and more preferably, 80 to 300 μm.

The content of the talc (D) in the flame-retardant polybutylene terephthalate resin composition of the present invention is preferably 1 to 50 parts by weight based on 100 parts by weight of the polybutylene terephthalate resin (A). The lower limit value of the content of the talc (D) is preferably 1 part by weight, more preferably, 2 parts by weight, and still more preferably, 3 parts by weight. When the content of the talc (D) is less than 1 part by weight, the flame retardancy and the tracking resistance tend to decrease. The upper limit value of the content of the talc (D) is preferably 50 parts by weight, more preferably, 40 parts by weight, and still more preferably, 35 parts by weight. When the content of the talc (D) exceeds 50 parts by weight, extrusion processability tends to deteriorate or the strength and the mechanical strength of a weld part tend to decrease.
(Anti-Dripping Agent (E))

To the flame-retardant polybutylene terephthalate resin composition of the present invention, it is preferable to add, for example, silicone oil, reaction group containing silicone oil, silica, and, particularly preferably, an anti-dripping agent (E) such as fluororesin, for an improvement of flame retardancy. In the case of using the anti-dripping agent (E) (for example, fluororesin) for the resin composition of the present invention, when the use amount thereof is excessively large, acid poisonous gas is generated during combustion in disposal or the like or molding, and when the use amount thereof is excessively small, the expected dripping prevention effect is not demonstrated in some cases. The use amount of the anti-dripping agent (E) is preferably 0.1 to 2 parts by weight based on 100 parts by weight of the polybutylene terephthalate resin (A). When used in such a range, the prevention effect is obtained in the case where dripping poses a problem, and thus the use in the range is preferable. The use amount of the anti-dripping agent (E) is more preferably 1 part by weight or less, and still more preferably, 0.5 parts by weight or less based on 100 parts by weight of the polybutylene terephthalate resin (A). The use amount of the anti-dripping agent (E) is preferably 0.2 parts by weight or more, and more preferably, 0.3 parts by weight or more based on 100 parts by weight of the polybutylene terephthalate resin (A).

As specific examples of the fluororesin as the anti-dripping agent (E), powder obtained by compounding fluororesin with other polymers, such as fluororesin such as polytetrafluoroethylene, polyvinylidene fluoride, a tetrafluoroethylene/vinylidene fluoride copolymer, and a tetrafluoroethylene/hexafluoropropylene copolymer, or polymers obtained by polymerizing (meth)acrylic acid ester, an aromatic alkenyl compound, vinyl cyanide, and the like in the presence of polytetrafluoroethylene and the like are mentioned.
(Amorphous Thermoplastic Resin (F))

In the flame-retardant polybutylene terephthalate resin composition of the present invention, an amorphous thermoplastic resin can be added in order to improve bleed-out resistance and warping resistance.

As specific examples of the amorphous thermoplastic resin (F), at least one kind of resin selected from the group consisting of polystyrene resin, polycarbonate resin, acrylic resin, polyphenyleneether (PPE) resin, ABS resin, polyetherimide resin, polysulfone resin such as polysulfone, polyphenyl sulfone, and polyether sulfone, and polyarylate resin is mentioned. The resin mentioned above may be used alone or in combination of two or more kinds thereof. By adding the component, the bleed-out resistance and the warping resistance can be improved. Moreover, mixtures such as polymer alloys and polymer blends with other polymers can also be used. Among the amorphous thermoplastic resin, polyphenyleneether resin and polyetherimide resin are particularly preferably used from the viewpoint of flame retardancy, heat resistance, heat durability, and electrical properties.

The polyphenyleneether resin (hereinafter abbreviated as PPE) mentioned above is a homopolymer or a copolymer having a structural unit represented by the following general formula 9.

General Formula 9

[C. 10]

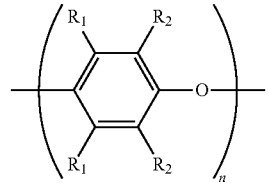

(In the general formula 9, $R_1$ represents a hydrogen atom, a primary or secondary alkyl group, an aryl group, an amino alkyl group, or a hydrocarbonoxy group, $R_2$ represents a primary or secondary alkyl group, an aryl group, or an alkylamino group, and n represents an integer of 10 or more.)

As the primary alkyl group represented by $R_1$ or $R_2$, methyl, ethyl, n-propyl, n-butyl, n-amyl, isoamyl, 2-methyl butyl, n-hexyl, 2,3-dimethyl butyl, a 2,3- or 4-methyl pentyl, or heptyl group is mentioned. As a preferable example of the secondary alkyl group, isopropyl, sec-butyl, or 1-ethylpropyl is mentioned. As a preferable homopolymer of PPE, a homopolymer containing a 2,6-dimethyl-1,4-phenylene ether unit is mentioned, for example. As a preferable copolymer, a random copolymer containing a combination of the structural unit represented by the general formula 9 and a 2,3,6-trimethyl-1,4-phenylene ether unit is mentioned.

In the PPE, those having an intrinsic viscosity measured at 30° C. in chloroform of preferably 0.2 to 0.8 dl/g, more preferably, 0.25 to 0.7 dl/g, and particularly preferably, 0.3 to 0.6 dl/g are suitably used. One having an intrinsic viscosity of less than 0.2 dl/g is not preferable because the production is industrially difficult and the impact resistance of the resin composition of the present invention is insufficient. When the intrinsic viscosity exceeds 0.8 dl/g, the amount of a gel component is large and the appearance of a molded article formed from the resin composition of the present invention deteriorates. In order to reduce the appearance viscosity of PPE, styrene resin having compatibility with PPE can be compounded in the PPE in an amount up to the maximum amount of 35% by weight. As the styrene resin mentioned herein, polystyrene, a styrene-butadiene copolymer, and the like are mentioned. When the amount of the styrene resin exceeds 35% by weight, markedly high inflammability is revealed as compared with that of the PPE, an increase in the combustion time and ignition due to dripping are easy to occur, and the frame retardancy imparting performance decreases, and thus the amount is not preferable.

The polyetherimide resin is a polymer containing an aliphatic, alicyclic, or aromatic ether unit and a cyclic imide group as the repeating unit and is not particularly limited insofar as the polymer has melt moldability. Moreover, structural units other than the cyclic imide and the ether bond, e.g., aromatic, aliphatic, alicyclic ester units, an oxycarbonyl unit, and the like, may be contained in the main chain of polyether imide insofar as the effects of the present invention are not impaired. In the present invention, from the viewpoint of melt moldability and cost, a condensate of 2,2-bis[4-(2,3-dicarboxyphenoxy)phenyl]propane dianhydride and m-phenylenediamine or p-phenylenediamine (for example, commercially available as "Ultem" (Registered Trademark) from SABIC Innovative Plastics) is preferably used.

The polysulfone resin is a thermoplastic resin having an aromatic ring group and a sulfonyl group as a bond group thereof in the main chain and is generally roughly divided into polysulfone, polyether sulfone, and polyphenyl sulfone.

The polysulfone resin is typically a polymer having a structure represented by the following general formula 10. For example, "Udel" (Registered Trademark) commercially available from Solvay Advanced Polymers can be used from the viewpoint of melt moldability and cost.

General Formula 10

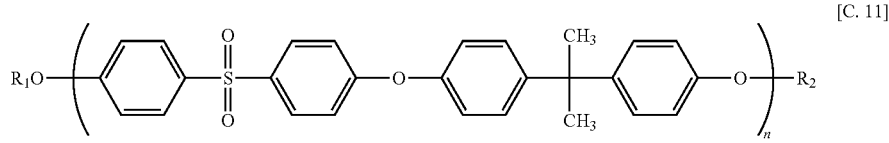

[C. 11]

(In the general formula 10, $R_1$ and $R_2$ represent a hydrogen atom or an alkyl group, a cycloalkyl group, or an aryl group having 1 to 30 carbon atoms.)

The polyether sulfone resin is obtained by the Friedel-Crafts reaction of diphenyletherchlorosulfone and is typically a polymer having a structure represented by the following general formula 11. For example, "Radel A" (Registered Trademark) commercially available from Solvay Advanced Polymers can be used from the viewpoint of melt moldability and cost.

General Formula 11

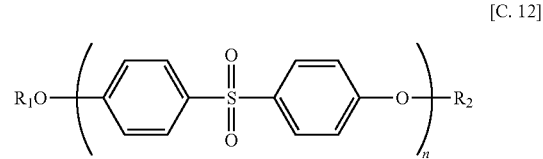

[C. 12]

(In the general formula 11, $R_1$ and $R_2$ represent a hydrogen atom or an alkyl group, a cycloalkyl group, or an aryl group having 1 to 30 carbon atoms.)

The polyphenyl sulfone resin is typically a polymer having a structure represented by the following general formula 12. For example, "Radel R" (Registered Trademark) commercially available from Solvay Advanced Polymers can be used from the viewpoint of melt moldability and cost.

General Formula 12

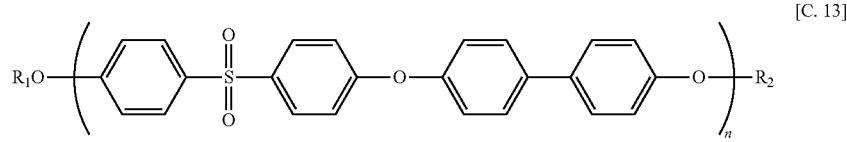

[C. 13]

(In the general formula 12, $R_1$ and $R_2$ represent a hydrogen atom or an alkyl group, a cycloalkyl group, or an aryl group having 1 to 30 carbon atoms.)

The polyarylate resin in the present invention is a resin containing aromatic dicarboxylic acids and bisphenols as the repeating unit.

As specific examples of the aromatic dicarboxylic acids, terephthalic acid, isophthalic acid, orthophthalic acid, 1,5-naphthalene dicarboxylic acid, 2,6-naphthalene dicarboxylic acid, diphenic acid, 4,4'-dicarboxydiphenylether, bis(p-carboxy phenyl)alkane, 4,4'-dicarboxydiphenylsulfone, and the like are mentioned, and, among the above, terephthalic acid and isophthalic acid are preferable.

As specific examples of the bisphenols, for example, 2,2-bis(4-hydroxyphenyl)propane, 2,2-bis(4-hydroxy-3,5-dimethylphenyl)propane, 4,4'-dihydroxydiphenyl sulfone, 4,4'-dihydroxydiphenyl ether, 4,4'-dihydroxydiphenyl sulfide, 4,4'-dihydroxydiphenyl ketone, 4,4'-dihydroxydiphenyl methane, 1,1-bis(4-hydroxyphenyl)cyclohexane, and the like are mentioned. These compounds may be used alone or as a mixture of two or more kinds thereof. In particular, 2,2-bis(4-hydroxy phenyl)propane is preferable from the economic viewpoint.

The content of the amorphous thermoplastic resin (F) in the flame-retardant polybutylene terephthalate resin composition of the present invention is preferably 1 to 20 parts by weight based on 100 parts by weight of the polybutylene terephthalate resin (A). The lower limit value of the content of the amorphous thermoplastic resin is preferably 1 part by weight, more preferably, 2 parts by weight, and still more preferably, 3 parts by weight. When the content of the amorphous thermoplastic resin is less than 1 part by weight, the warping resistance and the heat resistance are not sufficient in some cases. The upper limit value of the content of the amorphous thermoplastic resin is preferably 20 parts by weight, more preferably, 17 parts by weight, and still more preferably, 15 parts by weight. When the content of the amorphous thermoplastic resin exceeds 20 parts by weight, the mechanical strength at the early stage of a molded body sometimes decreases and also the cost increases.

Furthermore, an Acrylonitrile-Stylene resin can be compounded in the flame-retardant polybutylene terephthalate resin composition of the present invention. By compounding an Acrylonitrile-Stylene resin, the warping resistance, the moisture and heat resistance, and the tracking resistance of the resin composition can be improved.

The Acrylonitrile-Stylene resin usable in the present invention is styrene and acrylonitrile as the composition of a monomer or resin containing other monomers copolymerizable with the same.

As the other monomers mentioned above, aromatic vinyl compounds other than styrene, vinyl cyanide compounds, alkyl (meth)acrylates, maleimide monomers, and the like are mentioned. As the aromatic vinyl compounds other than styrene, α-methylstyrene, vinyltoluene, divinylbenzene, and the like are mentioned. As the vinyl cyanide compounds, methacrylonitrile and the like are mentioned. As the alkyl (meth)acrylates, alkyl (meth)acrylates such as methyl methacrylate, ethyl methacrylate, n-butyl methacrylate, methyl acrylate, ethyl acrylate, n-butyl acrylate, and stearyl acrylate, and the like are mentioned. As the maleimide monomers, maleimide, N-substituted maleimides such as N-methyl maleimide, N-ethyl maleimide, N-phenyl maleimide, N-cyclohexyl maleimide, and derivatives thereof, and the like are mentioned. In addition, diene compounds, dialkyl maleates, allyl alkyl ethers, unsaturatiod amino compounds, vinyl alkyl ethers, and the like are mentioned. These substances can be used alone or in combination of two or more kinds thereof.

The Acrylonitrile-Stylene resin in the present invention is preferably an epoxy-modified Acrylonitrile-Stylene resin in order to improve the compatibility between the polybutylene terephthalate resin (A) and the Acrylonitrile-Stylene resin. The epoxy-modified Acrylonitrile-Stylene resin is one obtained by introducing an epoxy group into the Acrylonitrile-Stylene resin. As a method for introducing an epoxy group, known arbitrary methods can be used. Specifically, an Acrylonitrile-Stylene resin obtained by graft polymerizing or copolymerizing epoxy group containing vinyl monomers is preferably used. The epoxy group containing vinyl monomer is a compound having both a vinyl group and an epoxy group which are radically polymerizable in one molecule. As specific examples, glycidyl esters of unsaturatiod organic acids such as glycidyl acrylate, glycidyl methacrylate, glycidyl ethacrylate, and glycidyl itaconate, glycidyl ethers such as allyl glycidyl ether, and 2-methyl glycidyl methacrylate, and the like are mentioned, and, among the above, glycidyl acrylate and glycidyl methacrylate can be preferably used. These substances can be used alone or in combination of two or more kinds thereof.

As a method for producing the Acrylonitrile-Stylene resin, known usual methods can be employed, and particularly, a method for copolymerizing styrene and acrylonitrile or other monomers copolymerizable with the same and a method for graft polymerizing a (co)polymer obtained by copolymerizing styrene and acrylonitrile with another monomer copolymerizable with the same are mentioned. Such copolymerization and graft polymerization can also be performed by known methods.

The content of the Acrylonitrile-Stylene resin in the flame-retardant polybutylene terephthalate resin composition of the present invention is preferably 1 to 40 parts by weight based on 100 parts by weight of the polybutylene terephthalate resin (A). The lower limit value of the content of the Acrylonitrile-Stylene resin is preferably 1 part by weight, more preferably, 2 parts by weight, and still more preferably, 3 parts by weight. When the content of the Acrylonitrile-Stylene resin is less than 1 part by weight, an improvement effect of warping resistance, heat resistance, moisture and heat resistance, and tracking resistance is not demonstrated in some cases. The upper limit value of the content of the amorphous thermoplastic resin is preferably 40 parts by weight, more preferably, 30 parts by weight, and still more preferably, 25 parts by weight. When the content of the amorphous thermoplastic resin exceeds 40 parts by weight, the mechanical strength at the early stage and the load deflection temperature of a molded body decrease in some cases and also the cost increases.

(Inorganic Filler (G))

To the flame-retardant polybutylene terephthalate resin composition of the present invention, an inorganic filler (G) other than talc can be added in order to improve the mechanical properties, the heat resistance, and the long-term reliability in a high temperature environment.

As specific examples of the inorganic filler (G) other than talc to be used in the present invention, glass fibers, carbon fibers, metal fibers, aramid fibers, potassium titanate whiskers, wollastonite, glass flakes, glass beads, mica, clay, calcium carbonate, barium sulfate, titanium oxide, aluminum oxide, and the like are mentioned, for example. These substances may be used alone or in combination of two or more kinds thereof.

As the glass fibers to be used in the present invention, known generally used glass fibers can be used and it is preferable to use chopped strand glass fibers treated with a binder from the viewpoint of workability.

In order to increase the adhesiveness of resin and glass fibers, the glass fibers to be used in the present invention are preferably glass fibers whose surface is treated with a coupling agent and glass fibers obtained using a binder may be acceptable. As the coupling agent, alkoxysilane compounds such as γ-aminopropyl triethoxy silane and γ-glycidoxypropyltrimethoxysilane are preferably used, for example. As the binder, epoxy resin, urethane resin, and the like are preferably used, for example, but the binder is not limited thereto. The glass fibers may be used alone or in combination of two or more kinds thereof.

When using the glass fibers for the present invention, the fiber diameter is preferably 1 to 20 μm and the fiber length is preferably 0.01 to 50 mm. When the fiber diameter is less than 1 μm, an expected reinforcement effect tends not to be obtained. When the fiber diameter exceeds 20 μm, the surface properties and the fluidity of a molded body tend to decrease. When the fiber length is less than 0.01 mm, an expected resin reinforcement effect tends not to be obtained. When the fiber length exceeds 50 mm, the surface properties and the fluidity of a molded body tend to decrease.

The content of the inorganic filler (G) other than talc in the present invention is preferably 5 to 120 parts by weight based on 100 parts by weight of the polybutylene terephthalate resin (A). The lower limit value of the content of the inorganic filler is preferably 5 parts by weight, more preferably, 10 parts by weight, and still more preferably, 15 parts by weight. When the content of the inorganic filler is less than 5 parts by weight, an improvement effect of the heat resistance and the rigidity is not sufficient in some cases. The upper limit value of the inorganic filler content is preferably 120 parts by weight, more preferably, 110 parts by weight, and still more preferably, 100 parts by weight. When the content of the inorganic filler exceeds 120 parts by weight, the fluidity of the resin composition in molding decreases, the thin-wall moldability is impaired, and the surface properties of a molded body decreases in some cases.

(Fluidity Modifier)

To the flame-retardant polybutylene terephthalate resin composition of the present invention, a fluidity modifier can be added in order to improve the fluidity of the resin composition in molding. As specific examples of the fluidity modifier, at least one kind of resin selected from the group consisting of (cyclic) polyester oligomers, polyester elastomers, and polyester-polyether copolymer resin is mentioned and these substances may be used alone or in combination of two or more kinds thereof. By adding this component, the fluidity of the resin composition in molding can be improved.

From the viewpoint of an improvement effect of the fluidity in injection molding and from the viewpoint of maintenance of heat resistance, mechanical properties, and electrical properties, the polyester-polyether copolymer is preferably a polymer containing 85 to 15% by weight of a polybutyleneterephthalate (PBT) unit and 15 to 85% by weight of a modified polyether unit, more preferably, a polymer containing 80 to 20% by weight of a PBT unit and 20 to 80% by weight of a modified polyether unit, and still more preferably, a polymer containing 70 to 30% by weight of a PBT unit and 30 to 70% by weight of modified polyether.

The molecular weight of the polyester-polyether copolymer is not particularly limited and is preferably a molecular weight in which the intrinsic viscosity (IV value) at 25° C. and 0.5 g/dl in a usual mixed solvent of tetrachloro ethane/phenol=50/50 (Weight ratio) is preferably in the range of 0.3 to 1.0 dl/g, and more preferably, in the range of 0.45 to 0.80 dl/g.

As methods for producing the polyester-polyether copolymer, using a catalyst selected from germanium compounds, titanium compounds, and antimony compounds, (1) a direct esterification method of three substances of terephthalic acid, butanediol, and modified polyether, (2) a transesterification method of three substances of terephthalic acid dialkyl, butanediol, and modified polyether and/or ester of modified polyether, (3) a method including adding modified polyether during or after transesterification of terephthalic acid dialkyl and butanediol, and then performing polycondensation, (4) a method including melting and mixing modified polyether using high molecular weight PBT, and then performing transesterification under melting and reduced pressure, and the like are mentioned but the production method is not limited thereto.

As the germanium compound to be used as a catalyst in the production of the polyester polyether copolymer, germanium oxides such as germanium dioxide, germanium alkoxides such as germanium tetraethoxide and germanium tetraisopropoxide, germanium hydroxide and an alkali metal salt thereof, germanium glycolate, germanium chloride, germanium acetate, and the like are mentioned, and these substances are used alone or in combination of two or more kinds thereof. Among these germanium compounds, germanium dioxide is particularly preferable.

The catalytic amount of the germanium dioxide to be charged in polymerization is preferably economically 1000 ppm or less.

When the polycarbonate resin is not compounded in the resin composition of the present invention, antimony compounds can be used as the catalyst for producing the polyester-polyether copolymer. As the antimony compound, antimony trioxide, antimony pentoxide, antimony trichloride, sodium antimonate, and the like are mentioned and these substances are used alone or in combination of two or more kinds thereof. Among these antimony compounds, antimony trioxide is preferable.

When the resin composition of the present invention is exposed to a high temperature in molding, coloring due to the antimony compound severely occurs in the polyester-polyether copolymer produced using the antimony compound as the catalyst in some cases. In order to avoid the coloring, the use of the germanium compounds mentioned above is preferable. However, since germanium is a rare metal and expensive, titanium compounds can be preferably used in order to suppress the coloring at low cost. As specific examples of the titanium compounds, tetra-n-butoxytitanium, tetra-i-propoxy titanium, tetrakis(2-ethylhexyloxy)titanium, and the like are mentioned.

The modified polyether unit is a unit represented by the following general formula 13 in which, with respect to the repeating unit numbers m and n of the oxyalkylene unit in the general formula 13, the number average of (m+n) is 8 to 100. When (m+n) is 7 or less, the fluidity is insufficient in some cases. Therefore, (m+n) is set to preferably 16 or more, more preferably, 24 or more, and still more preferably, 52 or more. When (m+n) exceeds 100, the heat stability decreases in some cases, and thus (m+n) is preferably 70 or less.

General Formula 13

[C. 14]

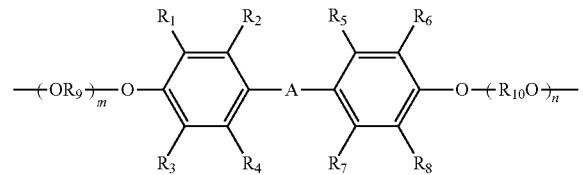

(In the general formula 13, A represents a direct bond or a divalent bond group such as a $-CH_2-$ group, a $-C(CH_3)_2$-group, a $-SO_2-$ group, a $-CO-$ group, a $-S-$ group, or a $-O-$group, $R_1$ to $R_8$ represent hydrogen, a hydrocarbon group having carbon atoms of 12 or less, $R_9$ and $R_{10}$ each represent an alkylene group having 2 to 4 carbon atoms, m and n each are an integer, and $8 \leq m+n \leq 100$ is satisfied.)

From the viewpoint of heat resistance and heat stability, for the partial structure A in the general formula 13, a direct bond, a —C(CH$_3$)$_2$— group, a —SO$_2$— group, a —CO— group, and a —O— group are preferably used and a —C(CH$_3$)$_2$— group is more preferable from the viewpoint of moldability and availability. $R_1$ to $R_8$ in the general formula 13 may be the same or may be different from each other. From the viewpoint of heat stability, hydrogen is preferable and $R_1$ to $R_8$ all preferably represent hydrogen. $R_9$ and $R_{10}$ in the general formula 13 are preferably ethylene groups from the viewpoint of heat stability and heat resistance.

As the most preferable modified polyether unit, one represented by the following general formula 14 can be mentioned.

General Formula 14

[C. 15]

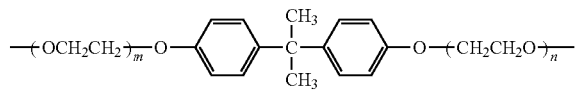

(In the general formula 14, m and n each are integers and $8 \leq m+n \leq 100$ is satisfied.)

A polybutylene terephthalate (PBT) unit to be used in the polyester-polyether copolymer is a polymer or a copolymer obtained from terephthalic acid or an ester-forming derivative thereof and a butanediol or an ester-forming derivative thereof, and is usually an alternating polycondensate.

For the terephthalic acid or the ester-forming derivative unit thereof, dicarboxylic acids other than terephthalic acids or a derivative thereof can be used in combination. As the dicarboxylic acids other than terephthalic acid or the derivative thereof, isophthalic acid, diphenyl dicarboxylic acid, diphenoxy ethane dicarboxylic acid, and the like are mentioned. In addition thereto, other aromatic oxycarboxylic acids such as oxybenzoic acid of a small proportion (15 mol % or less), or aliphatic or alicyclic dicarboxylic acids such as adipic acid, sebacic acid, and 1,4-cyclohexane dicarboxylic acid, may be used in combination. From the viewpoint of heat resistance, the content of the unit derived from the terephthalic acid or the derivative thereof is set to 51 mol % or more, preferably, 71 mol % or more, more preferably, 86 mol % or more, and still more preferably, 95 mol % or more based on the total amount of the unit derived from the terephthalic acid or the derivative thereof and the dicarboxylic acid unit other than the terephthalic acid or the derivative thereof.

As the butanediol, 1,2-butanediol, 1,3-butanediol, and 1,4-butanediol are mentioned, and 1,4-butanediol is preferably selected from the viewpoint of moldability. As low molecular weight glycol components forming other ester units with the butanediol, low molecular weight glycols having 2 to 10 carbon atoms, e.g., ethylene glycol, trimethylene glycol, hexanediol, decanediol, cyclohexane dimethanol, and the like, can be specifically used. From the viewpoint of heat resistance, the butanediol component is used in a proportion of 50 mol % or more, preferably, 70 mol % or more, more preferably, 15 mol % or more, and still more preferably, 95 mol % or more based on the total amount of the butanediol component and the low molecular weight glycol component.

As the ester-forming derivative of terephthalic acids, terephthalic acid dialkyl is preferable as described above. As an alkyl group of the terephthalic acid dialkyl, a methyl group is preferable from the viewpoint of transesterification reactivity.

As the solution viscosity of PBT of the polymers, the intrinsic viscosity (IV value) at 25° C. and at a concentration of 0.5 g/dl in a mixed solvent of phenol/tetrachloroethane=1/1 (Weight ratio) is preferably 0.4 to 1.3 dl/g, and more preferably, 0.6 to 1.2 dl/g from the viewpoint of the impact resistance, chemical resistance, or molding processability of a molded article to be obtained.

(Hydrolysis Stabilizer (H))

For the resin composition of the present invention, a hydrolysis stabilizer can be preferably used in order to impart moisture and heat resistance and the like. As the hydrolysis stabilizer, epoxy resin, a low molecular weight styrene-(meth)acrylic acid ester-epoxy group containing (meth)acrylic acid ester copolymer resin, a carbodiimide compound represented by the following general formula 15, and the like can be mentioned.

General Formula 15

[C. 16]

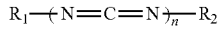

(In the general formula 15, $R_1$ and $R_2$ represent the same or different aliphatic, alicyclic, or aromatic groups having 3 to 30 carbon atoms. n is an integer of 1 or more.)

As the epoxy resin, epoxy compounds are mentioned. As epoxy compounds to be used in the present invention, bisphenol type epoxy compounds, resorcin type epoxy compounds, novolac type epoxy compounds, alicyclic compound type diepoxy compounds, glycidyl ethers, epoxidized polybutadiene, epoxy-modified thermoplastic resin, epoxy containing flame retardants, and the like are mentioned. More specifically, alicyclic compound type epoxy compounds such as a bisphenol A type epoxy compound, a bisphenol F type epoxy compound, a resorcin type epoxy compound, a novolac type epoxy compound, vinylcyclohexene dioxide, and dicyclopentadiene oxide, an ethyleneglycidyl methacrylate copolymer, and an epoxy oligomer of tetrabromobisphenol A are all preferably used. As the epoxy compound to be used in the present invention, a novolac type epoxy resin of an epoxy equivalent of 150 to 280 g/eq or a bisphenol A type epoxy resin of an epoxy equivalent of 600 to 3000 g/eq is preferably used from the viewpoint of hydrolysis resistance and dispersion in resin. More preferably, a novolac type epoxy resin of an epoxy equivalent of 180 to 250 g/eq and a molecular weight of 1000 to 6000 or a bisphenol A type epoxy resin of an epoxy equivalent of 600 to 3000 g/eq and a molecular weight of 1200 to 6000 is mentioned.

The low molecular weight styrene-(meth)acrylic acid ester-epoxy group containing (meth)acrylic acid ester copolymer resin may be a polymer having a weight average molecular weight of 10,000 or more. In order to obtain a higher effect with a small amount of the resin, oligomers having a molecular weight of preferably 7,000 or less, and more preferably, 5,000 or less are mentioned.

Among the hydrolysis stabilizers, the carbodiimide compound is particularly preferable, and the moisture and heat resistance of the polybutylene terephthalate resin composition is further improved by combining the same with an Acrylonitrile-Stylene resin.

When using the hydrolysis stabilizer for the resin composition of the present invention, the use amount thereof is preferably 0.03 to 15 parts by weight based on 100 parts by weight of the polybutylene terephthalate resin (A) according to the present invention. The upper limit of the use amount of the hydrolysis stabilizer is more preferably 10 parts by weight or less, and still more preferably, 8 parts by weight or less. The lower limit of the use amount of the hydrolysis stabilizer is more preferably 0.15 parts by weight or more, and still more preferably, 0.3 parts by weight or more. When the use amount of the hydrolysis stabilizers is excessively small, the effects thereof are not obtained. When the use amount thereof is excessively large, the moldability deteriorates in some cases, e.g., the fluidity of the resin composition is impaired.

(Impact Resistance Improver)

It is preferable for the resin composition of the present invention to further contain an impact resistance improver in a proportion of 0.5 to 50 parts by weight based on 100 parts by weight of the polybutylene terephthalate resin (A) in order to further improve the impact resistance and it is more preferable to contain the same in a proportion of 1 to 20 parts by weight from the viewpoint of heat resistance, rigidity, moldability, and the like.

As the impact resistance improver, one or more kinds selected from the group consisting of (1) multistage graft polymers, (2) polyolefin polymers, (3) olefin-unsaturated carboxylic acid ester copolymers and thermoplastic polyester elastomers is/are preferable.

The (1) multi-stage graft polymers are preferably those containing 10 to 90% by weight of one or more kinds of polymers for rubber formation selected from the group consisting of polybutadiene, a butadiene-styrene copolymer, a butadiene-acrylic acid ester copolymer, an acrylic acid ester polymer, and polyorganosiloxane and 10 to 90% by weight of a graft component configured from a polymer obtained by polymerizing one or more kinds of monomers selected from the group consisting of aromatic vinyl compounds, vinyl cyanide compounds, and (meth)acrylic acid ester compounds in the presence of the polymers for rubber formation. From the viewpoint of heat cycle resistance, the polymers for rubber formation are preferably acrylic acid ester polymers.

(Resin Other than Polybutylene Terephthalate Resin)

Resin other than the polybutylene terephthalate resin can be used in order to further improve the electrical properties such as tracking resistance and the heat resistance of the resin composition of the present invention. For example, a polymer or copolymer resin obtained by polymerizing one or more kinds of monomers selected from polyolefin resin, aromatic alkenyl, methacrylic acid ester, and acrylic acid ester, polyester resin other than a polybutylene terephthalate resin such as polyethylene terephthalate, and the like can be preferably used.

The use amount of the resin other than the polybutylene terephthalate resin is set to preferably 0.1 to 30 parts by weight, and more preferably, 0.5 to 10 parts by weight based on 100 parts by weight of the polybutylene terephthalate resin (A) from the viewpoint of electrical properties such as tracking resistance, efficient exhibition of flame retardancy, and maintenance of heat resistance.

(Antioxidant)

For the resin composition of the present invention, an antioxidant can be used for heat stability in molding processing. As such an antioxidant, a phenolic antioxidant, a phosphorus antioxidant, a sulfur antioxidant, and the like are mentioned. The type and the use amount thereof are in the ranges known by persons skilled in the art.

(Compounding Agent)

In the resin composition of the present invention, usually used compounding agents, i.e., a flame-retardant auxiliary such as zinc borate, zinc sulfide, or expandable graphite, a plasticizer, a lubricant, a melt viscosity (elasticity) regulator such as a high molecular weight polymethyl methacrylate resin or a low molecular weight styrene-acrylic copolymer resin, an ultraviolet absorber, a pigment, an organic fiber reinforcing agent such as aramid fibers, an antistatic agent, a mold release agent such as monoglyceride, silicone oil, or polyglycerol, a compatibilizer, a coupling agent of a filler and matrix resin, and the like, can be compounded as appropriate as necessary.

(Mixing Method)

When obtaining the resin composition of the present invention, the mixing of the polybutylene terephthalate resin, the phosphorus flame retardant having a polyester structure in the main chain, the nitrogen compound, talc, the anti-dripping agent and, as necessary, the amorphous thermoplastic resin, the Acrylonitrile-Stylene resin, the inorganic filler, the fluidity improver, the impact resistance improver, other kinds of resin, the hydrolysis stabilizer, the antioxidant, and other compounding agents can be performed by usual known kneading machines. As such machines, a mixing roll, a calender roll, a Banbury mixer, a Henschel mixer, a ribbon blender, a kneader, an extruder, and the like can be mentioned.

(Molding Method)

As a molding method for obtaining the molded body of the present invention, usual molding methods to be used in molding of thermoplastic resin compositions, i.e., an injection molding method, an extrusion molding method, a compression molding method, a blow molding method, a calender molding method, an inflation molding method, a rotational molding method, and the like can be used, and the injection molding method is most preferably used. In the injection molding, the molded body of the present invention can be obtained preferably using an insert molding method including setting a metal to be used as an electrode and the like to a die beforehand, and then pouring resin thereinto for molding.

(Electric/Electronic Parts)

One preferable embodiment of the present invention relates to electric/electronic parts. As such electric/electronic parts, an electronic control unit (ECU), a battery, a capacitor, a switching power supply, a sensor, a smart monitor, an actuator, a wire harness, a rectifier, a power module, a power conditioner, an inverter, a DC-DC converter, a dynamo, a motor, a servomotor, a linear motor, a transformer, a coil, a solenoid, a part for non-contact power supply device, a relay, a fan, an antenna, a piezoelectric element, a meter, an LED, a laser, a photocoupler, and the like are mentioned.

One preferable embodiment of the present invention relates to a member to be used in the electric/electronic parts. As such a member, a male connector, a female connector, a socket, a case, a coil bobbin, a relay case, a fan case, a jumper, an insulating board, an insulating sheet, and the like are mentioned. The molded body of the present invention can be suitably used as members for these electric/electronic parts.

One preferable aspect of members for electric/electronic parts of the present invention relates to the above-described members to be used in the above-described electric/electronic parts to be mounted on internal combustion engine drive type transport apparatuses using organic fuels such as gasoline, light oil, heavy oil, natural gas, and alcohol, typified by ships, airplanes, railroads, special construction vehicles, and fire vehicles, and particularly preferably automobiles. Such members can be obtained by metal insert molding an electrode by an injection molding method as necessary using the resin composition of the present invention.

One preferable aspect of members for electric/electronic parts of the present invention relates to the above-described members to be used in the above-described electric/electronic parts to be mounted on the same transport apparatuses as those described above using electric energy for the power. Such members can be obtained by metal insert molding an electrode by an injection molding method as necessary using the resin composition of the present invention.

The supply source of the above-described electric energy is not limited and secondary batteries such as a lithium-ion battery, a nickel-hydrogen battery, and a sodium sulfide battery, fuel cells using hydrogen, alcohol, and natural gas as the fuel, solar cells using silicon-cadmium-selenium-titanium oxide, and the like, capacitors, flywheels, and the like can be mentioned.

The electric/electronic parts of the present invention can be suitably used, as the final use, for, in addition to the above-described internal-combustion engine drive type transport apparatuses using organic fuels and the above-described transport machines using the electric energy for the power, power generators utilizing natural energy sources such as sunlight, wind power, wave power, heat of the earth, and hydraulic power, thermal power generation facilities and devices using a cogeneration system, coal, oil, natural gas, and the like, electricity accumulation facilities and apparatuses, transformation apparatuses, frequency conversion apparatuses, power transmission facilities, power supply facilities, smart grids, displays such as a television set, a monitors, an electrical scoreboard, and a projector, broadcasting facilities and apparatuses, communication facilities and apparatuses, radar apparatuses, networking devices, communication devices such as a telephone, monitoring devices such as a camera, lighting, air-conditioning systems, robots, signal apparatuses, backup power supply systems using secondary batteries, flywheels, capacitors, and the like, information devices, medical devices, nursing devices, construction devices, and the like. In particular, the electric/electronic parts of the present invention are suitable for the transport machines using electric energy for the power source, particularly electric automobiles.

EXAMPLES

Hereinafter, the resin composition of the present invention, the molded body containing the resin composition, and the electric/electronic parts containing the molded body and the members thereof are specifically described with reference to specific examples but the present invention is not limited thereto.

In the following measurement conditions, Examples, and the like, "part(s)" and "%" represent "part(s) by weight" and "% by weight", respectively.

First, used materials are described below.
[Polybutylene terephthalate resin: A1] Polybutylene terephthalate (PBT) resin (Product Name: NOVADURAN 5009L manufactured by Mitsubishi Engineering-Plastics Corporation)

[Polyethylene terephthalate resin] Polyethylene terephthalate (PET) resin (Product Name: EFG-70, manufactured by Bell Polyester Products, Inc.)
[Phosphorus flame retardant having polyester structure in main chain: B1] Produced in Production Example 1
[Nitrogen compound: C1] Melamine cyanurate (Product Name: MC-4000, manufactured by Nissan Chemical Industries, Ltd.) The nitrogen atom content was 49% by ICP-AES measurement.
[Phosphorus flame retardant other than B] Diethylphosphinic acid aluminum (Product Name: Exolit OP1240, manufactured by Clariant Japan K.K.) The phosphorus atom content was 22% by ICP-AES measurement.
[Talc: D1] Talc (Product Name: Rose talc, manufactured by Nippon Talc Co., Ltd.)
[Anti-dripping agent: E1] Polytetrafluoroethylene (Product Name: Fluon PTFE G355, manufactured by Asahi Glass Co., Ltd.)
[Amorphous thermoplastic resin: F1] Polyetherimide resin (Product Name: ULTEM1000 (Registered Trademark), manufactured by SABIC Innovative Plastics)
[Amorphous thermoplastic resin: F2] Polyphenyleneether resin (Product Name: Iupiace (Registered Trademark) PX-100L, manufactured by Mitsubishi Engineering-Plastics Corporation)
[Amorphous thermoplastic resin: F3] Polystyrene resin (Trade Name: Toyo Styrol (Registered Trademark) GP HRM24N, manufactured by Toyo Styrene Co., Ltd.)
[Acrylonitrile-Stylene resin] Acrylonitrile-Stylene resin (Trade Name: Stylac (Registered Trademark) 727, manufactured by Asahi Kasei Co., Ltd.)
[Inorganic filler: G1] Glass fiber chopped strands (Product Name: T187H, manufactured by Nippon Electric Glass Co., Ltd.)
[Inorganic filler G2: Pulverized mica powder, Volume average diameter measured by a laser diffraction method of 22 μm (Product Name: Muscovite mica A-21S manufactured by Yamaguchi Mica Co., Ltd.)
[Hydrolysis stabilizer: H1] Polycarbodiimide (Trade Name: Carbodilite (Registered Trademark) LA-1, manufactured by Nisshinbo Chemical Inc.)
[Flame retardant 1] Antimony trioxide (Product Name: PATOX-P, manufactured by Nihon Seiko Co., Ltd.)
[Flame retardant 2] Brominated polystyrene (Product Name: SAYTEX7010G, manufactured by Albemarle Japan Corporation)

Next, the equations and the measurement conditions are described.
(Tracking Resistance)

The obtained pellets were dried at 140° C. for 3 hours, and then injection molding was performed under the conditions of a cylinder set temperature of 250° C. to 280° C. and a die temperature of 120° C. using an injection molding machine (manufactured by Nissei Plastic Industrial, Co., Ltd. FN1000, Die clamping pressure: 80 tons) to give a 120 mm×120 mm×3 mm flat plate. According to IEC60112, about 0.1 wt % ammonium chloride aqueous solution was used as an electrolyte aqueous solution using a tracking resistance tester (manufactured by MYS-TESTER Company Limited). Values obtained by dividing the values obtained by the measurement by a 25 V unit were defined as comparative tracking indices.
(Flame Retardancy)

A strip shaped molded body of 127 mm×12.7 mm×Predetermined thickness (1/32 inch) was created, and then evaluated according to a UL-94 20 mm vertical flame test (V test). The test results were expressed by "V-0", "V-1", and "V-2"

in descending order of good flame retardancy and those which do not pass the UL-94 V test was indicated as "notV".

Production Example 1

Phosphorus Flame Retardant Having Polyester Structure in Main Chain: Production of B1

In a vertical polymerization unit having a distillation tube, a rectification tube, a nitrogen introduction tube, and a stirrer, 100 parts of 9,10-dihydro-9-oxa-10-phosphorphenanthrene-10-oxide (Product Name: HCA, manufactured by Sanko, Inc.), 60 parts of itaconic acid, and 160 parts of ethylene glycol were charged, the mixture was heated over 5 hours under a nitrogen gas atmosphere under stirring while increasing the temperature to 175° C., and then the mixture was further stirred at 195° C. for about 5 hours. During the operation, moisture distilled from the distillation tube was removed. Subsequently, 0.1 parts of germanium dioxide was added, and then a polycondensation reaction was performed under the conditions where the temperature was held at 220° C. at a reduced pressure of 1 Torr or less while distilling off the ethylene glycol. The timing when reaching a predetermined stirring torque was regarded as the completion of the reaction. The weight average molecular weight by GPC was 12,000 and the phosphorus atom content was 7% from the ICP-AES measurement.

(Phosphorus Atom Content and Nitrogen Atom Content)

The calculation was performed according to the equations shown below.

(Phosphorus atom content %)=(Number of parts by weight of phosphorus flame retardant)/(Sum of number of parts by weight of all the compounding agents in formulation example)×(Phosphorus atom content in phosphorus flame retardant %)   Equation 3

(Nitrogen atom content %)=(Number of parts by weight of nitrogen compound)/(Sum of number of parts by weight of all compounding agents in formulation example)×(Nitrogen atom content in nitrogen compound %)   Equation 4

(Load Deflection Temperature)

According to ASTM D-648, the measurement was performed at a load of 1.82 MPa.

(Moisture and Heat Resistance)

The obtained pellets were dried at 140° C. for 3 hours, and then injection molding was performed under the conditions of a cylinder set temperature of 250° C. to 280° C. and a die temperature of 80° C. using an injection molding machine (manufactured by Nissei Plastic Industrial, Co., Ltd. FN1000, Die clamping pressure: 80 tons) to give an ISO multi-purpose test piece A type molded body. According to ISO178, the bending strength measurement before a moisture and heat resistance test was performed. The test piece was measured for the bending strength after the moisture and heat resistance test at 85° C. and 95% RH for 1000 hours in a thermohygrostat (manufactured by Espec Corp.), and then the bending strength retention after the moisture and heat resistance test was calculated according to the following equation 5. Then, the value was defined as the moisture and heat resistance index.

(Bending strength retention % after moisture and heat resistance test)=(Bending strength after moisture and heat resistance test)/(Bending strength before moisture and heat resistance test)×100   Equation 5

Examples 1 to 11

Production of PBT Resin Composition

Preliminary mixing was performed with the ratios shown in Table 1, and then the mixtures were individually melt-kneaded at 240° C. using a biaxial extruder to give pellets. Using the obtained pellets, evaluation was performed by the methods described above. The results are shown in Table 1.

TABLE 1

(Compounding unit: part by weight)

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Polybutylene terephthalate resin A1 | | 100 | 100 | 100 | 100 | 100 | 100 | 100 | 100 | 100 | 100 | 100 |
| Phosphorus flame retardant B1 having polyester structure in main chain | | 24 | 45 | 24 | 25 | 25 | 57 | 54 | 54 | 20 | 5 | 6 |
| Nitrogen compound C1 | | 48 | 48 | 54 | 56 | 56 | 54 | 42 | 51 | 34 | 31 | 50 |
| Phosphorus flame retardant other than B | | | | | | | | | | 15 | 18 | 24 |
| Talc D1 | | 15 | 15 | 15 | 16 | 16 | 5 | 15 | 6 | 6 | 6 | 5 |
| Anti-dripping agent E1 | | 0.9 | 0.9 | 0.9 | 0.9 | 0.9 | 0.9 | 0.9 | 0.9 | 0.9 | 0.9 | 0.9 |
| Amorphous thermoplastic resin F1 | | 6 | 6 | | | | | | | | | |
| Amorphous thermoplastic resin F2 | | | | | 3 | | | | | | | |
| Amorphous thermoplastic resin F3 | | | | | | 3 | | | | | | |
| Acrylonitrile-Stylene resin | | | | | | | 25 | | | | | 25 |
| Inorganic filler G1 | | 91 | 91 | 91 | 93 | 93 | 73 | 91 | 91 | 73 | 67 | 91 |
| Inorganic filler G2 | | 15 | 15 | 15 | 16 | 16 | | | | | | |
| Hydrolysis stabilizer H1 | | | | | | | | | | | | 6 |
| Phosphorus atom content | % | 0.56 | 0.98 | 0.56 | 0.56 | 0.56 | 1.27 | 1.25 | 1.25 | 1.89 | 1.89 | 1.89 |
| Nitrogen atom content | % | 7.84 | 7.33 | 8.82 | 8.85 | 8.85 | 8.40 | 6.79 | 8.25 | 6.69 | 6.67 | 8.12 |
| Load deflection temperature | ° C. | 207 | 187 | 205 | 204 | 205 | 181 | 199 | 200 | 208 | 212 | 198 |
| Comparative tracking index | V | 475 | 600 | 600 | 600 | 600 | 600 | 600 | 600 | 575 | 575 | 600 |
| Flame retardancy 1/32 inch | judgement | V-0 | V-0 | V-0 | V-0 | V-0 | V-0 | V-0 | V-0 | V-0 | V-0 | V-0 |
| Moisture and heat resistance | % | — | — | — | — | — | 36% | — | 20% | 32% | 36% | 46% |

Comparative Examples 1 to 10

Production of Flame-Retardant PBT Resin Composition

Preliminary mixing was performed with the ratios shown in Table 2, and then the mixtures were individually melt-kneaded using a biaxial extruder at 240° C. to give pellets. Using the obtained pellets, evaluation was performed by the methods described above. The results are shown in Table 2. In Comparative Examples 7 and 10, since pelletizing by the extrusion was not able to be performed, the comparative tracking index and the flame retardancy were not evaluated.

Example 13

Production of Connector for Electronic Control Unit (ECU) to be Mounted on Hybrid Car By insert-molding the resin composition of Example 5 at a cylinder temperature of 260° C. and a die temperature of 80° C. using an injection molding machine JT100RAD manufactured by Japan Steel Works Ltd., a connector having an outside dimension of 105 mm in width×22 mm in depth×25 mm in height, a smallest wall thickness of 0.75 mm, and 48 pins of metal terminals was produced. After

TABLE 2

(Compounding unit: part by weight)

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Polybutylene terephthalate resin A1 | | | | 100 | 100 | 100 | 100 | 100 | 100 | 100 |
| PET resin | 100 | 100 | 100 | | | | | | | |
| Phosphorus flame retardant B1 having polyester structure in main chain | 9 | 10 | 22 | | 24 | | 100 | 24 | 24 | 24 |
| Nitrogen compound C1 | 26 | 29 | 29 | | 48 | 48 | 48 | | 10 | 140 |
| Flame retardant 1 | | | | 5 | | | | | | |
| Flame retardant 2 | | | | 20 | | | | | | |
| Talc D1 | 12 | 12 | 12 | | | 15 | 15 | 15 | 15 | 15 |
| Anti-dripping agent E1 | 0.7 | 0.7 | 0.7 | 0.9 | 0.9 | 0.9 | 0.9 | 0.9 | 0.9 | 0.9 |
| Amorphous thermoplastic resin F1 | | 5 | 5 | | 5 | 5 | 5 | 5 | 5 | 5 |
| Amorphous thermoplastic resin F2 | 2 | | | | | | | | | |
| Inorganic filler G1 | 81 | 73 | 73 | 54 | 91 | 91 | 91 | 91 | 91 | 91 |
| Inorganic filler G2 | | 12 | 12 | | 15 | 15 | 15 | 15 | 15 | 15 |
| Phosphorus atom content % | 0.27 | 0.29 | 0.61 | 0.00 | 0.59 | 0.00 | 1.87 | 0.67 | 0.64 | 0.43 |
| Nitrogen atom content % | 5.52 | 5.88 | 5.60 | 0.00 | 8.28 | 8.56 | 6.27 | 0.00 | 1.88 | 17.55 |
| Comparative tracking index V | 250 | 275 | 275 | 325 | — | — | Non-extrudable | — | — | Non-extrudable |
| Flame retardancy 1/32 inch judgement | V-0 | V-0 | V-0 | V-0 | V-1 | notV | | notV | notV | |

As shown in Tables 1 and 2, it is found that the resin composition of the present invention obtained by compounding the phosphorus flame retardant having a polyester structure in the main chain represented by the general formula 1, a nitrogen compound, talc, and an anti-dripping agent to a PBT resin is excellent in the balance among flame retardancy, tracking resistance, and moisture and heat resistance. Furthermore, it is found that the moisture and heat resistance of the obtained resin compositions is improved by further compounding an Acrylonitrile-Stylene resin and a hydrolysis stabilizer.

Example 12

Production of Connector for Electronic Control Unit (ECU) to be Mounted on Hybrid Car By insert-molding the resin composition of Example 1 at a cylinder temperature of 260° C. and a die temperature of 80° C. using an injection molding machine JT100RAD manufactured by Japan Steel Works Ltd., a connector having an outside dimension of 105 mm in width×22 mm in depth×25 mm in height, a smallest wall thickness of 0.75 mm, and 48 pins of metal terminals was produced. After confirming that the charging of the resin was favorably completed to fine portions, the connector was used for the production of ECU.

confirming that the charging of the resin was favorably completed to fine portions, the connector was used for the production of ECU.

Example 14

Production of Connector for Electronic Control Unit (ECU) to be Mounted on Hybrid Car By insert-molding the resin composition of Example 11 at a cylinder temperature of 260° C. and a die temperature of 80° C. using an injection molding machine JT100RAD manufactured by Japan Steel Works Ltd., a connector having an outside dimension of 105 mm in width×22 mm in depth×25 mm in height, a smallest wall thickness of 0.75 mm, and 48 pins of metal terminals was produced. After confirming that the charging of the resin was favorably completed to fine portions, the connector was used for the production of ECU.

Example 15

Production of Connector for Harness to be Mounted on Hybrid Car

By insert-molding the resin composition of Example 3 at a cylinder temperature of 260° C. and a die temperature of 80° C. using an injection molding machine JT100RAD manufactured by Japan Steel Works Ltd., a connector having an outside dimension of 70 mm in width×30 mm in depth× 29 mm in height and 24 pins of metal terminals was produced. After confirming that the charging of the resin was favorably completed to fine portions, the connector was used for the production of a harness having a maximum operating temperature of 120° C.

Example 16

Production of Battery Housing for Electric Vehicle

By insert-molding the resin composition of Example 3 at a cylinder temperature of 260° C. and a die temperature of 80° C. using an injection molding machine FE360S100ASE manufactured by Nissei Plastic Industrial Co., Ltd., a housing member having a dimension of 295 mm in width×210 mm in depth×100 mm in height, a smallest wall thickness of 1.2 mm, and a largest wall thickness of 8 mm was produced. After confirming that the charging of the resin was favorably completed to fine portions, the housing member was used for the production of a battery housing case.

Example 17

Production of Coil for Electromagnetic Induction Type Non-Contact Power Supply

By insert-molding the resin composition of Example 3 at a cylinder temperature of 260° C. and a die temperature of 80° C. using an injection molding machine FE360S100ASE manufactured by Nissei Plastic Industrial Co., Ltd., a coil bobbin having a dimension of 125 mm in diameter and 17 mm in height and a wall thickness of 0.95 mm was produced. After confirming that the charging of the resin was favorably completed to fine portions, MW79 enameled wire based on ANSI Standards was wound around the coil bobbin to produce a coil for non-contact power supply device.

Example 18

Production of Relay Case

By multi-cavity (8 pieces per shot) injection molding the resin composition of Example 1 at a cylinder temperature of 260° C. and a die temperature of 80° C. using an injection molding machine FAS-150B manufactured by Fanuc Corporation, a relay case having a dimension of 29 mm in width×19 mm in depth×27 mm in height, a wall thickness of 0.75 mm, and a smallest wall thickness of 0.35 mm was produced. After confirming that the charging of the resin was favorably completed to fine portions, the relay case was used for the production of a relay to be used in a control device containing a control coil of UL-1446 Class B and having a 24 VDC control/10A250 VAC output and a maximum operating temperature of 125° C. and the like.

As described above, it is found that the molded bodies produced using the resin composition of the present invention obtained by compounding the phosphorus flame retardant having a polyester structure in the main chain, a nitrogen compound, talc, and an anti-dripping agent in a polybutylene terephthalate resin can be favorably used as members of electric/electronic parts and is suitable for the production of electric/electronic parts.

The invention claimed is:

1. A halogen-free flame retardant polybutylene terephthalate resin composition comprising:
   5 to 80 parts by weight of a phosphorus flame retardant (B) having a polyester structure in a main chain;
   20 to 120 parts by weight of a nitrogen compound (C);
   1 to 50 parts by weight of talc (D);
   0.1 to 2 parts by weight of an anti-dripping agent (E); and
   1 to 40 parts by weight of an acrylonitrile-styrene resin, respectively based on 100 parts by weight of a polybutylene terephthalate resin (A), wherein
   the composition exhibits a comparative tracking index of 400 V or higher in a tracking resistance test in accordance with IEC60112.

2. The flame-retardant polybutylene terephthalate resin composition according to claim 1, further comprising:
   5 to 80 parts by weight of a phosphorus flame retardant other than the phosphorus flame retardant (B) based on 100 parts by weight of the polybutylene terephthalate resin (A).

3. The flame-retardant polybutylene terephthalate resin composition according to claim 1, wherein
   a content of phosphorus atoms in the resin composition is 0.3 to 3.5% by weight and a content of nitrogen atoms in the resin composition is 4 to 14% by weight.

4. The flame-retardant polybutylene terephthalate resin composition according to claim 1, further comprising:
   1 to 20 parts by weight of an amorphous thermoplastic resin (F) not including acrylonitrile-styrene resin based on 100 parts by weight of the polybutylene terephthalate resin (A).

5. The flame-retardant polybutylene terephthalate resin composition according to claim 1, further comprising:
   5 to 120 parts by weight of an inorganic filler (G) other than talc based on 100 parts by weight of the polybutylene terephthalate resin (A).

6. The flame-retardant polybutylene terephthalate resin composition according to claim 1, further comprising:
   0.03 to 15 parts by weight of a hydrolysis stabilizer (H) based on 100 parts by weight of the polybutylene terephthalate resin (A).

7. A molded article comprising:
   the flame-retardant polybutylene terephthalate resin composition according to claim 1.

8. An electric/electronic part comprising:
   the flame-retardant polybutylene terephthalate resin composition according to claim 1.

* * * * *